United States Patent
Jack et al.

(10) Patent No.: US 11,198,999 B2
(45) Date of Patent: Dec. 14, 2021

(54) METHOD AND SYSTEM FOR MANAGEMENT OF SEWER WASTE

(71) Applicant: Muddy River Technologies Inc., Delta (CA)

(72) Inventors: Peter Douglas Jack, Delta (CA); Robert John Stephenson, Vancouver (CA); Michael Stephen Gardner, Delta (CA)

(73) Assignee: Muddy River Technologies Inc., Delta (CA)

( * ) Notice: Subject to any disclaimer, the term of this patent is extended or adjusted under 35 U.S.C. 154(b) by 0 days.

(21) Appl. No.: 16/632,444

(22) PCT Filed: Jan. 31, 2018

(86) PCT No.: PCT/CA2018/000020
§ 371 (c)(1),
(2) Date: Jan. 20, 2020

(87) PCT Pub. No.: WO2019/014743
PCT Pub. Date: Jan. 24, 2019

(65) Prior Publication Data
US 2020/0224403 A1 Jul. 16, 2020

Related U.S. Application Data

(60) Provisional application No. 62/535,585, filed on Jul. 21, 2017.

(30) Foreign Application Priority Data
Jul. 21, 2017 (CA) ................. CA 2974059

(51) Int. Cl.
*E03F 5/16* (2006.01)
*C02F 1/40* (2006.01)
*C02F 101/32* (2006.01)

(52) U.S. Cl.
CPC ............... *E03F 5/16* (2013.01); *C02F 1/40* (2013.01); *C02F 2101/325* (2013.01); *C02F 2201/004* (2013.01); *C02F 2307/08* (2013.01)

(58) Field of Classification Search
CPC ........ E03F 5/16; C02F 1/40; C02F 2101/325; C02F 2201/004; C02F 2307/08; C02F 2103/002; B01D 17/0211
(Continued)

(56) References Cited

U.S. PATENT DOCUMENTS 5,108,591 A * 4/1992 Hagan ............... E02B 15/106
  210/104
5,204,000 A * 4/1993 Steadman .......... B01D 17/0214
  210/519

(Continued)

FOREIGN PATENT DOCUMENTS

CA 2874355 6/2015

OTHER PUBLICATIONS

Westgate, Amy, PCT International Search Report of PCT/CA2018/000020, dated May 7, 2018, 3 pages, ISA/CA, Gatineau, Quebec, Canada.

*Primary Examiner* — Claire A Norris
*Assistant Examiner* — Ekandra S. Miller-Cruz
(74) *Attorney, Agent, or Firm* — Antony C. Edwards

(57) ABSTRACT

Method and system for treatment of a wastewater stream at a location is disclosed. The wastewater stream includes a floating waste component such as sewer FOG or oil and an aqueous component such as water. The wastewater stream is directed from the location to a separator through an intake which is fluidly connected to the location and the separator. The separator separates the floating waste component from the aqueous component. The separated floating waste component is directed to a floating waste discharge outlet (Continued)

associated with the separator and the separated aqueous component is directed to an aqueous discharge outlet associated with the separator.

15 Claims, 7 Drawing Sheets

(58) Field of Classification Search
USPC .......................................................... 210/115
See application file for complete search history.

(56) References Cited

U.S. PATENT DOCUMENTS

| | | | | |
|---|---|---|---|---|
| 5,405,538 | A | * | 4/1995 | Batten ................ B01D 17/0214 210/104 |
| 5,492,619 | A | * | 2/1996 | Batten ................ B01D 17/0208 210/86 |
| 5,573,349 | A | * | 11/1996 | Paoluccio ........... B01D 17/0202 210/170.03 |
| 7,011,752 | B2 | | 3/2006 | Broeders et al. |
| 7,314,549 | B2 | * | 1/2008 | Swift ................. B01D 21/0003 210/170.03 |
| 2001/0047965 | A1 | | 12/2001 | Ghalib |
| 2014/0083950 | A1 | * | 3/2014 | Usher .................. E02B 15/045 210/739 |
| 2016/0237672 | A1 | * | 8/2016 | Becker ...................... E03F 5/22 |

\* cited by examiner

METHOD AND SYSTEM FOR MANAGEMENT OF SEWER WASTE

CROSS REFERENCE TO RELATED APPLICATIONS

This application claims priority from U.S. Provisional Patent Application No. 62/535,585, filed on Jul. 21, 2017, entitled: "Method and System For Management of Sewer Waste" and Canadian Patent Application No. 2,974,059, filed on Jul. 21, 2017, entitled: Method and System For Management of Sewer Grease", entireties of which are incorporated herein by reference.

FIELD

Embodiments described herein relate to a method and system for management of sewer waste, more particularly, to a method and system for management of floating waste including grease.

BACKGROUND

Sewer waste from homes, businesses and industries typically contains grease which is a semi-solid gelatinous and cohesive material, composed primarily of fats, oils and grease. Sewer grease or sewer FOG or FOG includes a lipid component and a solid component.

Sewer waste including FOG is discharged to municipal sewer systems through which it is transported to one or more wastewater treatment facilities. Sewer systems typically include a network of lift stations (gravity collection systems), pumping stations, pressurized pipes known as force mains, and sewer lines/pipes. Lift stations typically include a collection well or tank below ground surface, usually in the form of a concrete walled pit into which sewer waste flows by gravity. Lift stations are accessed from the ground level through a utility manhole or the like and contain therein various components such as ladders; pipes; pumps and its associated components etc. Because of the various components located within a lift station, the interior of the lift station is crowded and working space within a lift station is very limited.

FOG adheres to solid surfaces that it contacts, resulting in plugged sewer pipes and fouled lift stations. A main characteristic of FOG is its highly disagreeable odor due to a high concentration of smell-producing contaminants.

FOG is also corrosive by nature due to the presence of contaminants such as hydrogen sulphide (H2S) and may slough off the solid surfaces to which they adhere. This results in large masses of dislodged material that may cause clogging of downstream pipes and pumps. Corrosion may also result in degradation of the physical systems over time.

FOG also coalesces on itself and on other floating solids and debris present in the sewer systems, resulting in small and large clumps of floating waste. These clumps may also cause clogging of pipes and lines, thereby interfering with the lift station or force mains operations.

It is clear from the above that FOG results in several problems. Management of FOG involves on-going maintenance to keep the pipes/lines open, and enormous capital costs to replace irreversibly occluded sewer pipes/lines. As one skilled in the art will understand, physically cleaning the pipe systems is expensive, messy, and dangerous work.

Mechanical skimmers such as weir skimmers, belt skimmers, rope skimmers, and brush skimmers are known to remove free-floating oil from an aqueous environment. However, Applicant believes that such skimmers are poorly suited to remove FOG since they are not designed to process solid components such as those contained in sewer FOG.

Coalescing plate separators and various other technologies such as air flotation, chemical coagulation, and electrocoagulation are also known for separation of liquid free oils from an aqueous environment. Again, these separators and technologies are not designed to process solid components such as those contained in FOG. These separators and technologies are also expensive and include large and complex equipment that may not be suited for installation within a sewer system such as within a lift station.

Further, Applicant believes that screens or meshes generally used to remove objectionable material from an aqueous environment may not work to remove sewer FOG due to the extreme fouling nature of FOG. In order to work, such screens or meshes will have to be self-cleaning. Self-cleaning screens are mechanically complex and involve components that may not be suited for either installation or maintenance inside the limited space available within a lift station or at the force mains.

Therefore, it would be beneficial in terms of cost and efficiency if a system for removing FOG from a sewer system was available which was inexpensive and simple to install and maintain within a sewer system.

SUMMARY

Embodiments described herein relate to a method and system for removal and management of floating waste.

Accordingly, in one embodiment a method for treatment of a wastewater stream at an intermediate location in a sewer system to remove floating waste from the wastewater stream is provided. The wastewater stream includes at least a floating waste component and an aqueous component. The method includes directing the wastewater stream towards at least one separator which is operatively and fluidly connected to the intermediate location. The method further comprises separating the floating waste component from the aqueous component in the at least one separator and directing the separated aqueous component to the intermediate location.

Accordingly, in another embodiment a system for treatment of a wastewater stream at an intermediate location in a sewer system to remove floating waste from the wastewater stream is provided. The wastewater stream includes at least a floating waste component and an aqueous component. The system includes at least one intake which is fluidly connected to the intermediate location for drawing in and transferring the wastewater stream from the intermediate location. The system further includes at least one separator which is fluidly connected to the at least one intake and which is configured to receive the wastewater stream from the at least one intake. The at least one separator is further configured to separate the floating waste component from the aqueous component. The system also includes a floating waste discharge outlet which configured to receive the separated floating waste component and an aqueous discharge outlet which is configured to receive the separated aqueous component.

Accordingly, in another embodiment a system for treating a wastewater stream within a containment area is provided. The wastewater stream includes at least a floating waste component and an aqueous component. The system comprises at least one intake which is fluidly connected to the containment area for drawing in and transferring the wastewater stream from the containment area. The system further comprises at least one separator which is fluidly connected to the at least one intake and which is configured to receive the wastewater stream from the at least one intake. The at least one separator is further configured to separate the floating waste component from the aqueous component. The system also includes a floating waste discharge outlet which is configured to receive the separated floating waste component and an aqueous discharge outlet which is configured to receive the separated aqueous component. In this embodiment, the floating waste is oil.

DETAILED DESCRIPTION

Embodiments described herein relate to method and system for removal and management of floating waste including at least FOG in a sewer system.

As used herein, "floating waste" includes FOG or FOG in conjunction with non-FOG floating debris such as plastic debris, disposable wipes, rags, paper towels, hygiene products etc. or oil or other waste objects floating on a water surface due to a buoyancy force, for example due to a lower specific gravity than water. As stated above, FOG comprises a lipid component and a solid component.

As used herein, "a wastewater stream" includes a portion of liquid and floating waste contained therein. Accordingly, a wastewater stream as used herein includes a floating waste component and an aqueous component.

The wastewater stream may be located at an intermediate location within a sewer system. The intermediate location may be for example a lift station or a force main. "A wastewater stream" when used in conjunction with a lift station includes a portion of the liquid in the lift station having the floating waste and when used in conjunction with a force main includes a portion of liquid flowing through the force main which contains the floating waste.

Figure 1:
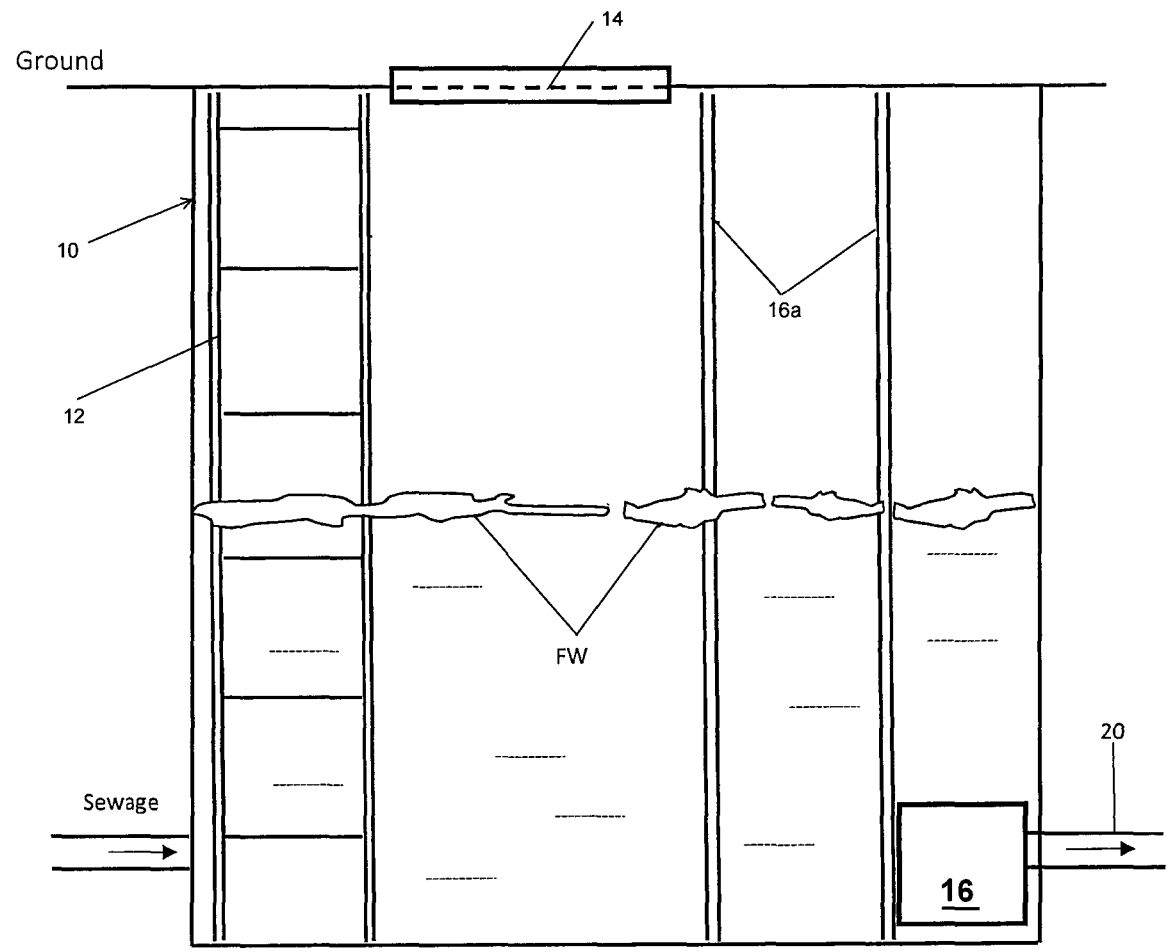
FIG. 1 is a schematic cross-sectional elevation view of a lift station, the drawing illustrating various components of the lift station.

Sewer waste including floating waste FW is typically received within a lift station 10 for onward transfer to a waste treatment facility (not shown). The lift station 10 has various internal components (best seen in FIG. 1) including a ladder 12 for enabling a repair person to climb down into the lift station 10 through an access such as a utility manhole 14 or the like. Also located within the lift station are one or more pumps 16 and its associated components such as pump rails 16a and float switches (not shown).

Sewer waste from the lift station 10 is generally conveyed to one or more treatment facilities through pressurized pipes commonly referred to in the art as force mains 20.

Figure 2:
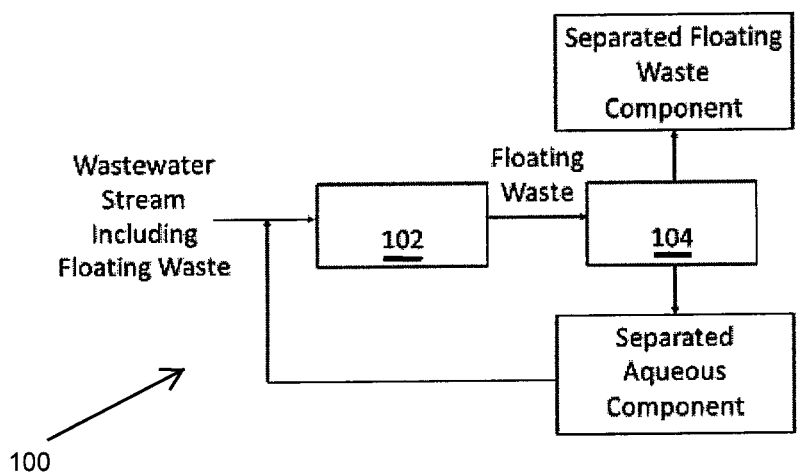
FIG. 2 is a block diagram illustrating various components of a system for removal and management of floating waste according to one embodiment.

In one embodiment and with reference to FIG. 2, the system 100 described herein for treatment of a wastewater stream at an intermediate location within a sewer system comprises at least one separator intake 102 fluidly connected to the intermediate location and at least one separator 104 for drawing in the wastewater stream from the intermediate location and transferring the wastewater stream to the at least one separator 104. The at least one separator 104 is configured to receive the wastewater stream from the at least one intake 102 and to separate the floating waste component contained in the wastewater stream from the aqueous component. The system further comprises a floating waste discharge outlet 106 which is configured to receive and discharge from the separator the separated floating waste component, and an aqueous discharge outlet 108 which is configured to receive from the separator and discharge back into the intermediate location such as lift station 10 the separated aqueous component.

Figure 3:
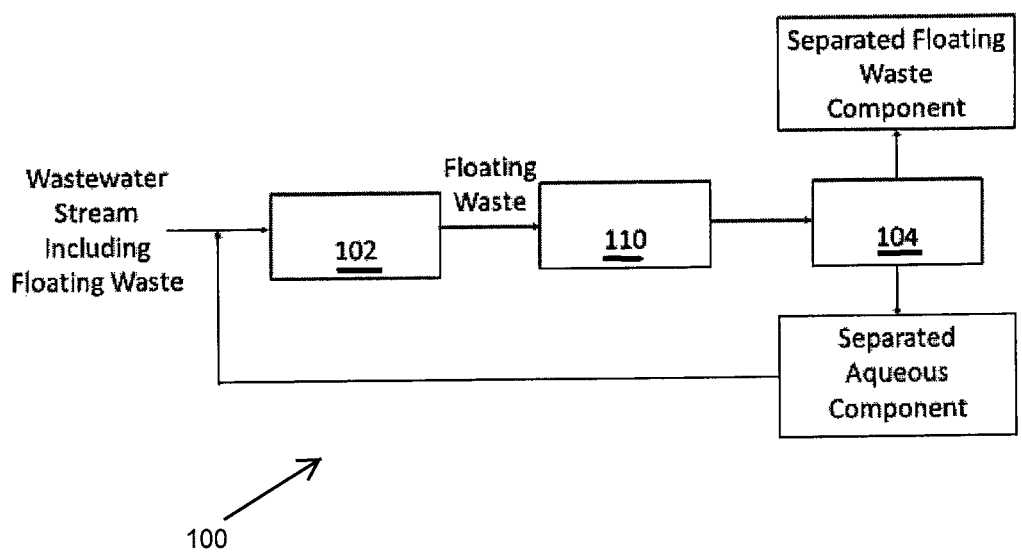
FIG. 3 is a block diagram illustrating various components of a system for removal and management of floating waste according to another embodiment.

In one embodiment and with reference to FIG. 3, the system 100 further includes a vacuum unit 110 which is operatively coupled to the at least one intake 102 and the least one separator 104. In this embodiment, the at least one intake 102 is activated through the at least one vacuum unit 110 to draw in the mixed wastewater stream and transfer the drawn in mixed wastewater stream from the intermediate location.

As contemplated, the system 100 may be located anywhere within the sewer system, for example the system 100 may be located within the lift station 10 or adjacent to the lift station 10 or adjacent to the force main 20.

Figure 4:
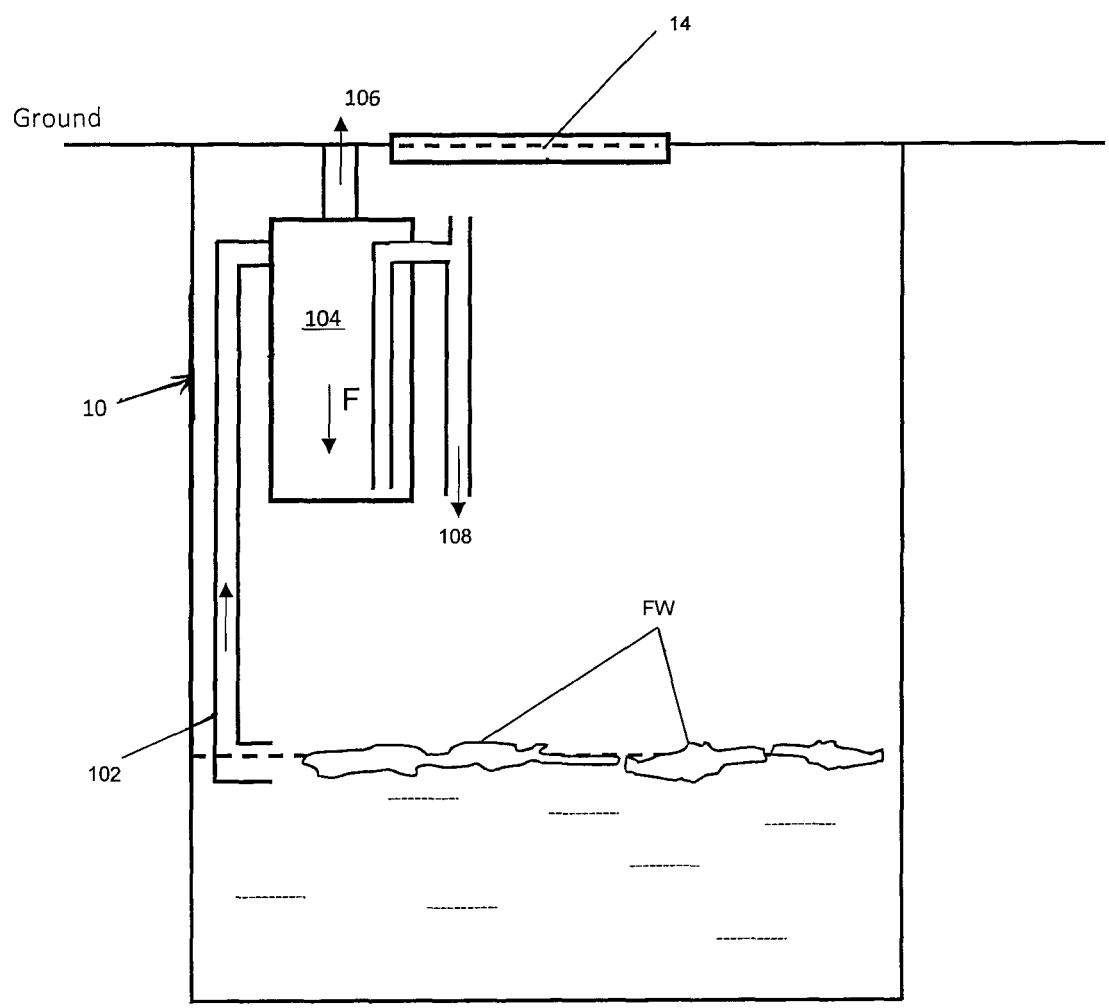
FIG. 4 is a schematic cross-sectional elevation view of a lift station, the lift station housing the system of FIG. 2, conventional internal components of the lift station such as those shown in FIG. 1 have been omitted in this drawing.
Figure 5:
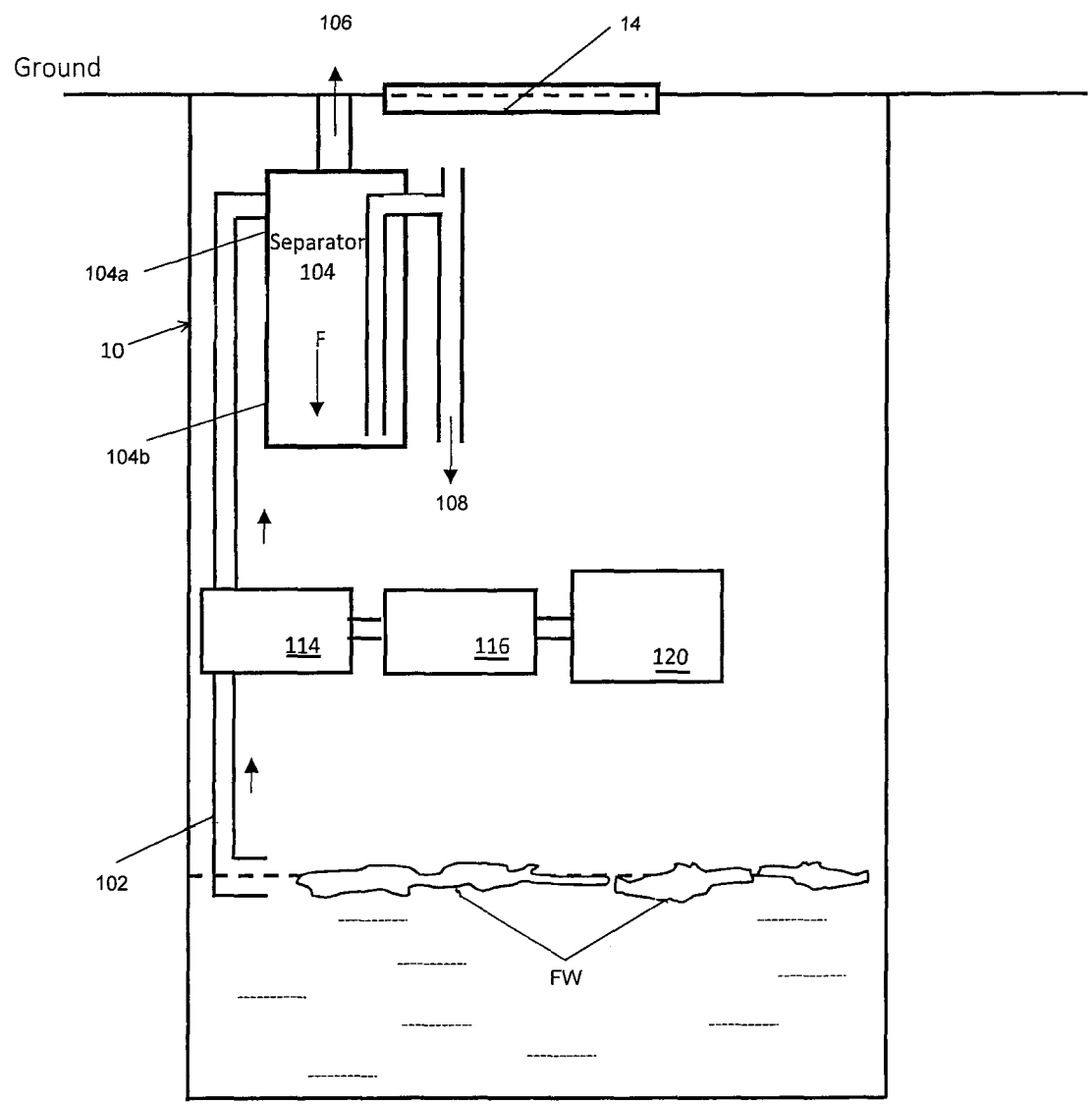
FIG. 5 is a schematic cross-sectional elevation view of a lift station, the lift station housing the system of FIG. 3, conventional internal components of the lift station such as those shown in FIG. 1 have been omitted in this drawing.

FIGS. 4 and 5 illustrate embodiments where all the components of the system 100 are located within a lift station 10. With reference to FIG. 4, wastewater stream located within the lift station 10 is drawn in through separator intake 102 and is transferred therethrough to separator 104. In one embodiment, the intake 102 is a pipe or a hose which is positioned within the lift station 10 to draw in the wastewater stream. As stated above, the wastewater stream includes floating waste FW. The intake 102 may be floating or may be located at a fixed location within the lift station 10. In one embodiment, the intake 102 is located at a fixed position within the lift station 10 and the wastewater stream is drawn into the intake 102 when the liquid level in the lift station coincides with the intake 102. Since floating waste FW may be in the form of large clumps as it tends to coalesce on itself and other floating debris, the intake 102 may be designed to accommodate the large clumps of floating waste FW or reduce the size of the floating waste FW clumps so that wastewater stream may be transferred through the intake 102 to the separator 104 without clogging the intake 102. Accordingly, in one embodiment, a cutter or macerator (not shown) may be located within the intake 102 to reduce the size of the floating waste clumps before they are introduced into the separator 104.

The separator 104 is configured to receive the wastewater stream from the intake 102. In one embodiment, the separator 104 is a sealed vessel having two ends, for example an upper end 104a and a lower end 104b. The sealed vessel may have a circular cross section or a rectangular cross section. The interior of the sealed vessel defines a flow path F which extends between its two ends. In this embodiment, the flow path F extends between the upper end 104a and the lower end 104b of the sealed vessel. The separator 104 is sized, shaped and positioned relative to the intake 102 such that the wastewater stream is introduced into the sealed vessel through the upper end 104a and slowly flows downward along the flow path F towards the lower end 104b. This flow pattern of the wastewater stream within the separator 104 permits the floating waste component which is of higher buoyancy than the aqueous component to separate from the aqueous component under gravity and collect within the upper portion 104 of the separator 104.

The cross sectional area of the separator 104 is such that the buoyancy of the floating waste is greater than the down flow velocity in the separator. The height of the separator is such that it provides sufficient retention time for the wastewater stream within the separator to permit effective separation of the floating waste component from the aqueous component.

The separated floating waste component is discharged from the separator 104 through a floating waste discharge outlet 106 located near the upper end 104a of the separator 104. The separated aqueous component is allowed to flow out from the separator 104 and back into the lift station 10 through an aqueous discharge outlet 108 located near the lower end of the separator 104. In one embodiment, the separated floating waste component is allowed to accumulate in the separator 104 and the accumulated/collected separated waste component is discharged from the separator when the accumulated/collected separated waste component reaches a predetermined level within the separator 104. Storage of the floating waste component within the separator may be improved by maximizing the height of the separator relative to the available space within the lift station. This enables the separated floating waste to be retained within the separator for longer periods of time thereby reducing the necessity to clean out the separator frequently.

In one embodiment and with reference to FIG. 5, the wastewater stream in the lift station 10 is drawn in and transferred by the intake 102 under vacuum. Accordingly, in this embodiment, the intake 102 is fluidly connected to the separator 104 through a vacuum unit 110. In one embodiment, the vacuum unit 110 includes a vacuum tank 114 which is operatively coupled to a vacuum pump 116. Wastewater stream including floating waste FW is drawn in by the intake 102 and transferred by the intake 102 to the separator 104 when the intake 102 is activated by the vacuum unit 110. The vacuum pump 116 is activated to create a negative pressure in the vacuum tank 114. Once a sufficient vacuum in the vacuum tank 114 is created, for example up to 30 inches of mercury (101.4 kPa, 14.7 psi or 760 torr) of vacuum pressure, an intake valve (not shown) on the vacuum tank 114 is opened to cause a sudden inflow of wastewater into the intake 102 and to the vacuum tank 114. The vacuum tank 114 continues to fill with the wastewater until the pressure inside the vacuum tank 114 is equilibrated with the pressure in the intake 102 or until a set liquid level in the vacuum tank 114 is reached. Wastewater captured within the vacuum tank 114 may be discharged to the separator 104 by gravity or by pumping. Alternatively, wastewater captured within the vacuum tank 114 may be discharged to the separator 104 by pressurizing the vacuum tank 114 to displace its contents to the separator 104. The vacuum tank 114 may include level switches and/or pressure gauges (not shown) for controlling displacement of captured wastewater from the vacuum tank 114.

Figure 6:
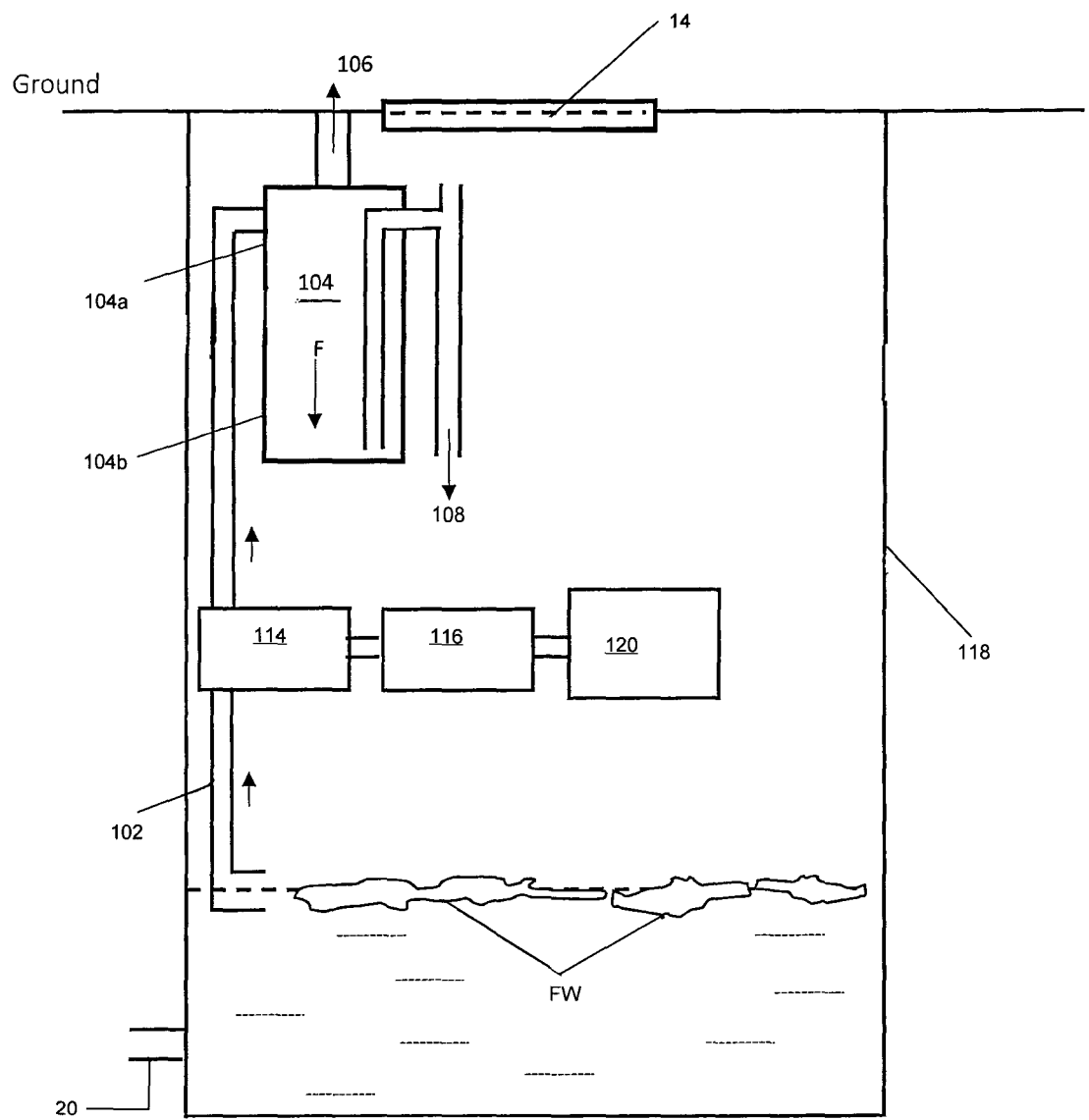
FIG. 6 is a schematic diagram illustrating an embodiment where the system of FIG. 3 is operatively and fluidly connected to a force main.

FIG. 6 illustrates an embodiment where the system 100 is operatively and fluidly coupled to a force main 20. As explained above, force main 20 is a pressurized pipe through which the wastewater stream flows. In this embodiment, the wastewater stream flowing through the force main 20 and containing floating waste FW, prior to being treated, is first diverted into a separate holding tank 118. The various components of the system 100 may be located within the holding tank 118 or may be located adjacent to the holding tank 118. In the embodiment of FIG. 6, all the components of the system 100 are located within the holding tank 118. Accordingly, the holding tank 118 contains the intake 102 connected to the separator 104 through a vacuum unit 110. The functioning of the various components of system 100 remain the same. The wastewater stream diverted into the holding tank 118 is drawn in and transferred through the intake 102 to the separator 104 using the vacuum unit 110. In the separator 104, the floating waste component in the wastewater stream is separated from the aqueous component. The separated aqueous component is directed to the aqueous discharge outlet 108 and the separated floating waste component is directed to the floating waste discharge outlet 106. The separated waste component may be directed back to the force main 20 through the aqueous discharge outlet 108.

In one embodiment, the system 100 may further include an odour eliminating unit 120 such as a scrubber or biological filter or an activated carbon adsorber or an ozonator to reduce or eliminate the highly disagreeable odor of the wastewater stream.

As one skilled in the art will appreciate, design parameters of the various components of system 100 including intake 102, separator 104 and vacuum unit 110 will depend on a multitude of factors, including flow rate of the wastewater stream, quantity of floating waste FW present in the wastewater stream, and dimensions of the lift station and force main.

The following paragraphs describe operation of the system 100. As explained above, system 100 may be fluidly connected to an intermediate location in the sewer system for treatment of a wastewater stream present at the intermediate location. In one embodiment, the treatment method includes directing the wastewater stream towards at least one separator 104 operatively and fluidly connected to the intermediate location through at least one intake 102. The wastewater stream includes a floating waste component and an aqueous component. The method further comprises separating the floating waste component from the aqueous component in the at least one separator 104 and directing the separated aqueous component to the intermediate location.

In one embodiment, the at least one intake 102 is activated using a vacuum unit 110 which is operably connected to the at least one intake 102.

In one embodiment, the floating component is separated from the aqueous component by flowing the wastewater stream through the at least one separator along a flow path which permits the floating waste component to separate from the aqueous component within the at least one separator under gravity.

The system described herein is simple and employs equipment which are inexpensive and which may be readily installed within a sewer system.

Figure 7:
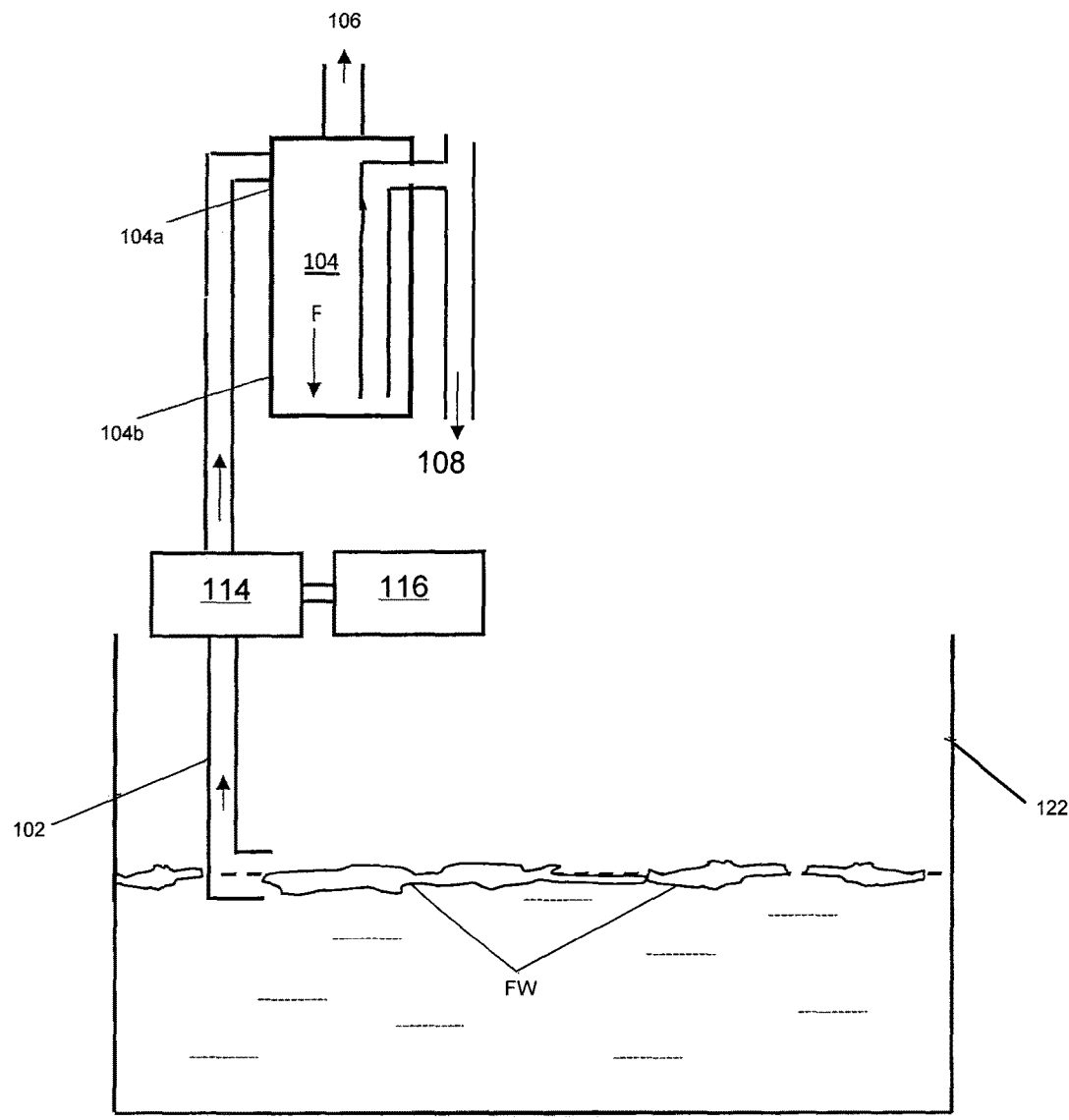
FIG. 7 is a schematic diagram illustrating an embodiment where the system of FIG. 3 is used to separate oil from oil laden water.

Even though the system 100, described herein, primarily finds application within a sewer system for removal of sewer FOG, Applicant believes that system 100 may also be used to separate oil from oil laden water within a containment area, for example a floating boom located over a body of water or a separation tank. In one embodiment and with reference to FIG. 7, a wastewater stream containing a mixture of oil and water is received within a separation tank 122. All the components of system 100, namely the intake 102, the separator 104 and vacuum unit 110 are located within or adjacent to the separation tank 122. Functioning of the system 100 remains the same. The intake 102 is activated using the vacuum unit 110 to draw in and transfer the wastewater stream from the separation tank 120 to the separator 104. In the separator 104, the floating waste component, namely oil from the wastewater stream is separated from the aqueous component, namely water, under gravity. The separated aqueous component is directed to the aqueous discharge outlet 108 and the separated floating waste component is directed to the floating waste discharge outlet 106 for onward transmission or disposal.

What is claimed is:

1. A method for treating a wastewater stream within a lift station in a sewer system, the wastewater stream including at least a floating waste component and an aqueous component, the method comprising:
    fluidly connecting an intake to the wastewater stream;
    operatively and fluidly connecting a vacuum tank to the intake, wherein the vacuum tank is located within the lift station;
    operatively coupling a vacuum pump to the vacuum tank, wherein the vacuum pump is exterior to the vacuum tank;
    activating the vacuum pump so as to draw in at least a portion of the wastewater stream through the intake and transferring the drawn in portion of the wastewater stream to the vacuum tank,
    directing the drawn in portion of the wastewater stream from the vacuum tank to separator which is operatively and fluidly connected to the vacuum tank;
    separating the floating waste component from the aqueous component in the separator;
    directing the separated aqueous component to the lift station, and
    wherein the step of activating the vacuum pump creates a vacuum within the vacuum tank which results in the portion of the wastewater stream being drawn in through the intake and transferred to the vacuum tank without contacting the vacuum pump.

2. The method of claim 1 further comprising a step of removing the separated floating waste component from the separator upon the separated floating waste component reaching a predetermined level in the separator.

3. The method of claim 1, wherein the step of directing the drawn in portion of the wastewater stream from the vacuum tank to the separator further comprises:
    pressurizing the vacuum tank to displace the drawn in portion of the wastewater stream from the vacuum tank.

4. The method of claim 1, wherein the step of separation further comprises:
    flowing the drawn in portion of the wastewater stream through the separator along a flow path which permits the floating waste component to separate from the aqueous component within the separator under gravity.

5. The method of claim 1, wherein the vacuum pump and the separator are located outside and adjacent to the lift station.

6. A system for treating a wastewater stream within a lift station in a sewer system, the wastewater stream including at least a floating waste component and an aqueous component, the system comprising:
    an intake fluidly connected to the wastewater stream;
    a vacuum tank operatively and fluidly connected to the intake, wherein the vacuum tank is located within the lift station;
    a vacuum pump operatively coupled to the vacuum tank, wherein the vacuum pump is exterior to the vacuum tank, and wherein activation of the vacuum pump results in at least a portion of the wastewater stream to be drawn in through the intake and transferred to the vacuum tank;
    a separator operatively and fluidly connected to the vacuum tank and configured to receive the drawn in portion of the wastewater stream from the vacuum tank, the separator being further configured to separate the floating waste component from the aqueous component;
    a floating waste discharge outlet configured to receive the separated floating waste component;
    an aqueous discharge outlet configured to receive the separated aqueous component and direct the separated aqueous component to the lift station; and
    wherein the vacuum pump is configured to create a vacuum within the vacuum tank which results in the portion of the wastewater stream being drawn in through the intake and transferred to the vacuum tank without contacting the vacuum pump.

7. The system of claim 6, wherein the intake is a pipe.

8. The system of claim 6, wherein the separator is a sealed vessel which is sized, shaped and positioned to direct the drawn in portion of the wastewater stream along a flow path which permits the floating waste component to separate from the aqueous component under gravity.

9. The system of claim 8, wherein the flow path begins at about an upper end of the sealed vessel and ends at about a lower end of the sealed vessel and the portion of the wastewater stream is introduced into the sealed vessel through the upper end and flows slowly downwards towards the lower end.

10. The system of claim 8, wherein the floating waste discharge outlet and the aqueous discharge outlet are formed on the sealed vessel.

11. The system of claim 6, wherein the vacuum pump and the separator are located outside and adjacent the lift station.

12. A system for treating a wastewater stream within a containment area, the wastewater stream including at least a floating waste component and an aqueous component, the system comprising:
    an intake fluidly connected to the containment area;
    a vacuum tank operatively and fluidly connected to the intake, wherein the vacuum tank is located within the containment area;
    a vacuum pump operatively coupled to the vacuum tank, wherein the vacuum pump is exterior to the vacuum tank, and wherein activation of the vacuum pump results in at least a portion of the wastewater stream to be drawn in through the intake and transferred to the vacuum tank;
    a separator operatively and fluidly connected to the vacuum tank and configured to receive the drawn in portion of the wastewater stream from the-vacuum tank, the separator being further configured to separate the floating waste component from the aqueous component;
    a floating waste discharge outlet configured to receive the separated floating waste component;
    an aqueous discharge outlet configured to receive the separated aqueous component and direct the separated aqueous component to the containment area; and wherein the vacuum pump is configured to create a vacuum within the vacuum tank which results in the portion of the wastewater stream being drawn in through the intake and transferred to the vacuum tank without contacting the vacuum pump.

13. The system of claim 12, wherein the wastewater stream is a mixture of oil and water.

14. The system of claim 13, wherein the floating waste component is oil and the aqueous component is water.

15. The system of claim 12, wherein the containment area is a separation tank.

* * * * *